Sept. 29, 1931.  H. LIEBETRUTH  1,825,532
DRAWING SLATE
Filed Feb. 21, 1929  3 Sheets-Sheet 1
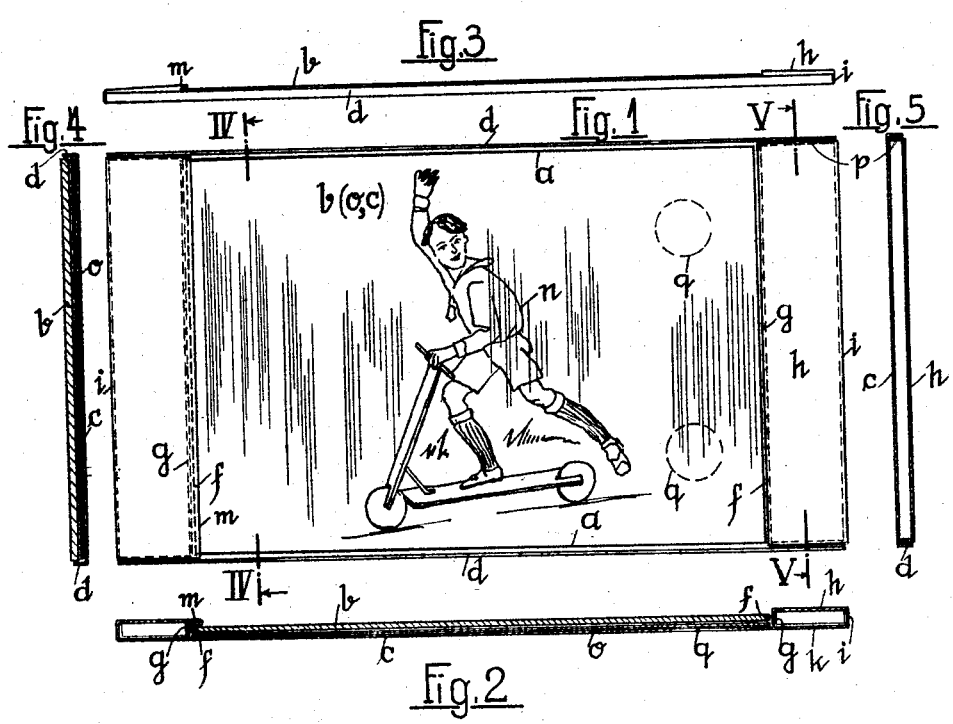
INVENTOR Sept. 29, 1931.  H. LIEBETRUTH  1,825,532
DRAWING SLATE
Filed Feb. 21, 1929  3 Sheets-Sheet 2
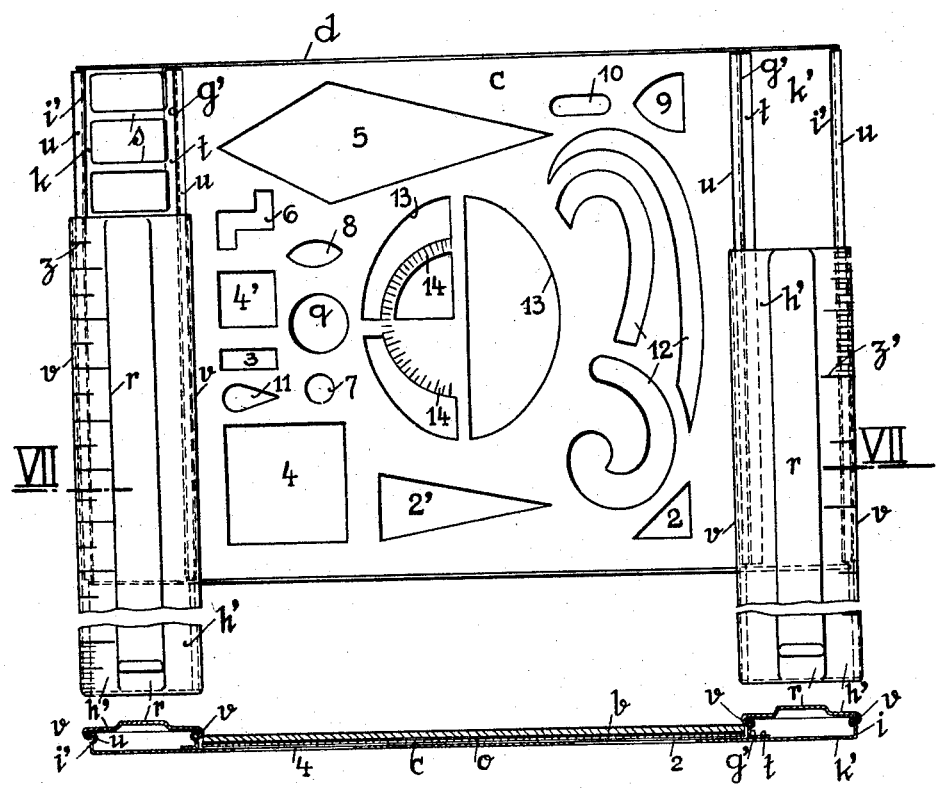
INVENTOR Sept. 29, 1931.  H. LIEBETRUTH  1,825,532
DRAWING SLATE
Filed Feb. 21, 1929    3 Sheets-Sheet 3
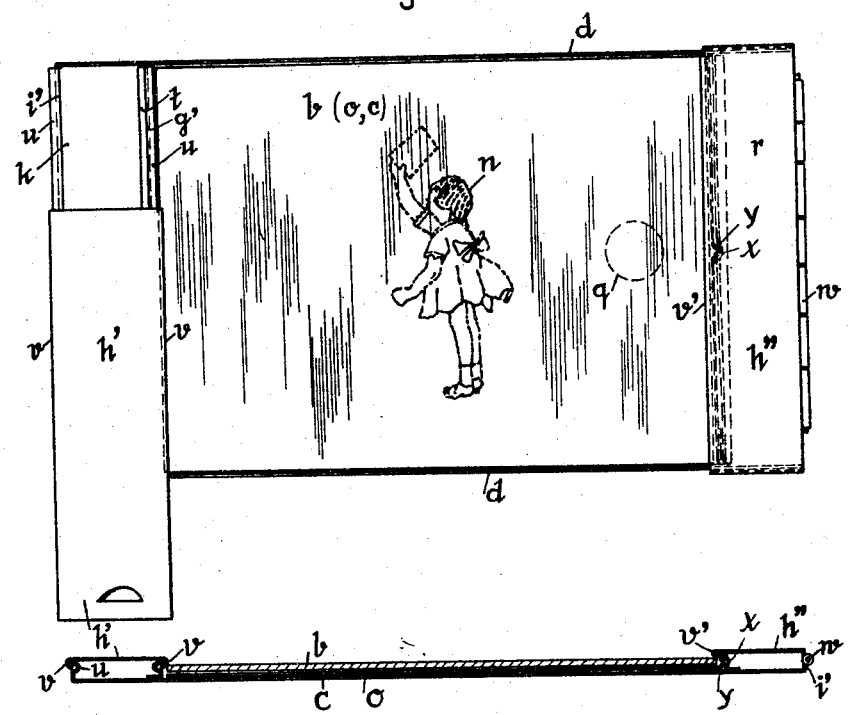
INVENTOR Patented Sept. 29, 1931

1,825,532

UNITED STATES PATENT OFFICE

HUGO LIEBETRUTH, OF NUREMBERG, GERMANY, ASSIGNOR TO A. LIEBETRUTH & CO. G. M. B. H., OF NUREMBERG, GERMANY

DRAWING SLATE

Application filed February 21, 1929, Serial No. 341,772, and in Germany October 4, 1928.

This invention relates to the amusement and educational articles, known as drawing slates, which are intended to make it easier for a child to learn to draw and paint, as it has only to trace or paint over the copy placed under and visible through the glass plate. The known drawing slates have a wooden frame, against the front inwardly projecting bars of which the ground glass is pressed from the back. For the pressing on of the ground glass and for the pressing of the original under the ground glass a carrying plate of wood or cardboard is used. This carrying plate with the frame on its front side is placed on the original. The carrying plate is forced on by means of a clamping tension bar mounted on its rear side. The wedge-shaped chamfered extremities of this bar engage, when the bar is being turned on the rear surface of the carrying plate, with slots in the frame. The clamping bar exerts its greatest pressure when it is across the pressure plate. It then supports the pressure plate however only at its centre. The pressure plate and the ground glass plate can therefore yield out of this center when the pencil is pressed on hard. By this movement of the ground glass plate the accuracy of the tracing is hindered. By the provision of a second transverse clamping bar this springing back of the ground glass is weakened already to a certain extent. But the changing of the copy is thereby rendered more complicated and difficult for the child.

Besides these main faults, that either a sure seat is not provided for the ground glass plate or the changing of the copy is rendered more difficult, these drawing slates possess the disadvantages that the clamping bar easily breaks when, being forcibly turned into the transverse position it strikes with one of its ends against the lateral bar of the frame instead of engaging with the slot of this bar. A further inconvenience is the inevitably great thickness and heavy weight of the wooden frame, which can easily come out of joint when allowed to fall or when it is thrown about intentionally.

This invention has for its object the provision of a drawing slate which does not possess these disadvantages. For this purpose the novelty consists in this that the plate carrying the copy and the ground glass is formed of a sheet metal plate and the frame for holding the ground glass is of sheet metal having retaining ledges extending round all four edges of the ground glass. Hereby the inserting and pressing on of the ground glass and the changing of the copies can be effected from the front. The changing of the copies is easier from the front as the slate need not every time be turned over. By doing away with this necessity of turning over, the front of the slate is saved from quick wear. The plate can further be easily washed. It is also suitable for notes in the household or in business. The new drawing slate is not so delicate and therefore more durable than the old kind with wooden frame. It weighs less and takes up less room in the school satchel and when being shipped requires much less space owing to its being only slightly thicker than the ground glass plate.

According to the invention the stops for the longitudinal edges of the ground glass can be formed by bent up edge ledges of the sheet metal plate extending at the most up to the upper surface of the ground glass, and the stops for the transverse edges of the ground glass are formed by the inner walls of hollow flat bars, the left wall of which grips over the left hand edge of the ground glass with a covering rib at its top edge, the right hand wall forming a supporting surface for the drawing hand which is flush with or only slightly projects over the ground glass.

A further development of the invention consists in replacing the flat hollow side bars by sheet metal boxes with sliding or hinged lids designed to hold the pencil and brushes or colors. The inwardly projecting edges of the closed lids are connecting means on both sides for the ground glass which, when the sheet metal boxes are closed, ensure against falling out when the drawing slate is being turned upside down.

A feature of the invention consists in providing the sheet metal plate with apertures for tracing with a pencil along their edges.

Several embodiments of the invention are illustrated by way of example in the accompanying drawings in which Fig. 1 shows a top plan view of a drawing slate with flat hollow lateral bars.

Fig. 2 is a longitudinal section of Fig. 1.

Fig. 3 is a front elevation of Fig. 1.

Fig. 4 is a cross-section on the line 4—4 and

Fig. 5 a cross section on line 5—5 of Fig. 1.

Fig. 6 shows a top plan view of a drawing slate with the ground glass removed and having apertures for tracing in the bottom and side containers with sliding covers.

Fig. 7 is a longitudinal section on line 7—7 of Fig. 6.

Fig. 8 shows a top plan view of a drawing slate the left side container of which has a sliding lid and the right side container a hinged lid.

Fig. 9 is a longitudinal section of Fig. 8.

Referring to Figs. 1 to 5 the abutments for the longitudinal edges $a$ of the ground glass $b$ are formed by the edges $d$ bent up at right angles from the sheet metal bottom plate $d$ and extending half way up to the upper surface of the ground glass, whereas the transverse edges $f$ of the ground glass abut against the inner walls $g$ of hollow U-shaped flat bars $g$, $h$, $i$, $k$ formed from extensions of the sheet metal bottom plate $c$ and inwardly directed above said bottom plate. The left hand flat bar has a rib $m$ folded in the top thereof under which rib the ground glass is pushed after the paper original $o$ of a drawing $n$ printed thereon has been inserted. The left hollow flat bar projects with its covering rib $m$ only imperceptibly over the inserted ground glass whereas the right flat bar is flush with this latter. Downwardly bent end faces $p$ close the flat bars so that also in the case of flat bars which extend somewhat above the ground glass no sharp sheet metal edges project at the ends. Finger incisions $q$ facilitate the lifting out of the ground glass for changing the copy.

As can be seen the right flat bar offers a comfortable rest for the drawing hand. But moreover there are avoided any sheet metal flaps and hooks projecting from the bottom on which a child might injure itself when drawing or changing the copy. Sharp glass plate edges are no longer exposed.

The hollow space in the flat bars may be utilized for storing the drawing and painting utensils. For this purpose these hollow spaces are made in the form of sheet metal boxes with sliding or hinged lids. With this object in view lids $h^1$ are made of the top parts $k$ of the flat bars, said lids having appropriate raised portions $r$. The outer walls $i^1$ are bent up from the sheet metal bottom plate $k^1$ similarly to the outer walls $i$ of the hollow flat bars. The inner walls $g^1$ of the receptacles on the other hand are formed by angle bars $g^1$, $t$ rigidly secured to the sheet metal bottom plate. A color holding net $s$ is stored in the color box.

According to Figs. 6 and 7 the walls $t^1$ and $g^1$ of the two receptacles on either side of the drawing slate are shaped at the top to form guide tongues $u$ for the edge grooves $v$ of slidable lids $h^1$, $v$, so that on both sides sliding boxes are provided, the inner walls $g^1$ of which form side stops for the transverse edges of the glass plate $f$ whereas the inside sliding grooves $v$ projecting beyond these edges effect the locking of the glass plate as long as the sliding lids are wholly or partly closed. The closed boxes have outwardly the appearance of flat bars. The sliding lids are provided along one edge with a scale $z$ in millimeters and with an inch scale $z^1$ on the other edge.

According to Figs. 8 and 9 a hinged lid $h''$, $v^1$ respectively is secured to the outer wall $i^1$ of the right receptacle by means of a hinge $w$. The projecting edge $v^1$, which projects in inward direction when the lid is closed, serves also to hold down the ground glass. The punched projection $y$ engaging with the punched depression $x$ keeps the lid in its closed position. Naturally a hinged lid could be provided on both sides.

In all the embodiments the bottom plate $c$ of the slate can be provided with appropriate apertures as shown in Figs. 5 and 7, the contours of which, after removal of the ground glass and the copy, can be traced on paper by means of a pencil. The contours of these apertures can be of any desired shape and vary considerably according to the age of the children for whom the drawing slates are intended. For younger children the contours of letters can be stamped out whereas for older children surfaces such as triangles 2. 2', rectangles 3, squares 4, 4', rhomboids 5, Z-profiles 6, circles 7, 7', arc slots 8, shield shape 9, rounded slots 10, gutti-forms 11, curve templates 12 and ellipses 13 can be cut out so that the children will become accustomed to geometrical and decorative figures. For their amusement these children can produce all kinds of beautiful geometric and decorative designs by skillfully combining the elementary figures, either on paper or on the ground glass placed thereunder, which designs can also be painted. For older children an agle protractor 14 may be left standing in the cut out ellipsis.

I claim:—

1. A drawing slate comprising in combination a sheet metal plate adapted to carry original pictures and ground glass plate, and a frame for said ground glass plate consisting of sheet metal abutment bars extending along all four sides of said sheet metal plate, abutments for the longitudinal edges of the ground glass plate formed by the edges bent up from the carrying plate to not higher than the upper surface of the ground glass plate, sheet metal boxes one on each side of said sheet metal plate adapted to hold drawing and painting utensils, the inside walls of said boxes forming abutments for the transverse edges of said ground glass plate, a hinged lid for each box, a projecting edge of each lid adapted to hold said inserted ground glass plate and the original picture on the sheet metal bottom plate.

2. A drawing slate comprising in combination a ground glass plate, a sheet metal plate adapted to carry original pictures and said ground glass plate, and a frame for said ground glass plate consisting of sheet metal abutment bars extending along all four sides of said sheet metal plate, abutments for the longitudinal edges of the ground glass plate formed by the edges bent up from the carrying plate to not higher than the upper surface of the ground glass plate, sheet metal boxes, one on each side of said sheet metal plate adapted to hold drawing and painting utensils, the inside walls of said boxes adapted to form the abutments for the transverse edges of said ground glass plate, a shiftable lid for each box marked with a scale, a projecting edge of each lid adapted to hold said inserted ground glass plate and the original picture on the sheet metal bottom plate.

3. A drawing slate as specified in claim 2 in which the sheet metal bottom plate has apertures, the contours of which are adapted to be traced with a pencil on paper or on the ground glass plate placed under said bottom plate after original picture and ground glass plate have been removed from the frame.

4. A drawing slate as specified in claim 2 in which the sheet metal bottom plate has apertures forming a triangle, rectangle, square, rhomboid, Z-profile, circle, arcuate slot, shield shape, rounded slot, gutti-form slot, curve, templet and part of an ellipse, the contours of which are adapted to be traced with a pencil on paper or on the ground glass plate placed under said bottom plate after original picture and ground glass plate have been removed from the frame.

5. A drawing slate as specified in claim 2 in which the sheet metal bottom plate has apertures forming within the circumference of which is formed a protractor connected to the metal defining the ellipse, the contours of which are adapted to be traced with a pencil on paper or on the ground glass plate placed under said bottom plate after original picture and ground glass plate have been removed from the frame.

In testimony whereof I affix my signature.

HUGO LIEBETRUTH.